United States Patent
Sprague et al.

(10) Patent No.: US 10,128,007 B2
(45) Date of Patent: Nov. 13, 2018

(54) CHIMNEYS HAVING JOINABLE UPPER AND LOWER SECTIONS WHERE THE LOWER SECTION HAS INTERNAL PARTITIONS

(71) Applicant: GE-Hitachi Nuclear Energy Americas LLC, Wilmington, NC (US)

(72) Inventors: Robin D. Sprague, Wilmington, NC (US); Gerald A. Deaver, Wilmington, NC (US); David A. Rickard, Wilmington, NC (US); David L. Major, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 837 days.

(21) Appl. No.: 14/792,512

(22) Filed: Jul. 6, 2015

(65) Prior Publication Data
US 2017/0011812 A1 Jan. 12, 2017

(51) Int. Cl.
*G21C 15/26* (2006.01)
*G21C 13/02* (2006.01)
(Continued)

(52) U.S. Cl.
CPC ............. *G21C 15/26* (2013.01); *G21C 13/02* (2013.01); *G21C 19/02* (2013.01); *G21C 19/07* (2013.01); *G21C 19/19* (2013.01); *Y02E 30/40* (2013.01)

(58) Field of Classification Search
CPC ................................. G21C 13/02; G21C 15/26
(Continued)

(56) References Cited

U.S. PATENT DOCUMENTS

| | | |
|---|---|---|
| 2,994,657 A | 8/1961 | Petrick |
| 3,150,051 A | 9/1964 | Ammon |
| 4,947,485 A | 8/1990 | Oosterkamp |

(Continued)

FOREIGN PATENT DOCUMENTS

| | | |
|---|---|---|
| EP | 0405981 | 2/1991 |
| JP | 6036992 A | 2/1985 |

(Continued)

OTHER PUBLICATIONS

European Search Report and Opinion issued in connection with corresponding EP Application No. 16178125.7 dated Nov. 17, 2016.

*Primary Examiner* — Jack W Keith
*Assistant Examiner* — Daniel Wasil
(74) *Attorney, Agent, or Firm* — Ryan Alley IP (57) ABSTRACT

Chimneys include several combinable parts usable in nuclear reactors. The parts are modular and removably joinable without destruction for use in directing flow in an operating nuclear reactor and directly fit in storage area during non-operation. Chimney parts are joinable through flanges and connecting structures. Chimney parts may include partitions that divide or direct energetic coolant flow from a nuclear core as well as steam separating and drying structures. The parts each individually fit within storage areas of the nuclear plant, including equipment or buffer pools in the refueling floor of the plant. Methods move the chimney parts between the reactor and storage areas, and multiple parts may be stacked or nested in such moves. Methods are usable underwater and with storage pools to prevent exposure of chimney parts during an outage. During operation, chimneys are usable in place of existing single-piece chimneys.

20 Claims, 6 Drawing Sheets

(51) Int. Cl.
  *G21C 19/19* (2006.01)
  *G21C 19/02* (2006.01)
  *G21C 19/07* (2006.01)

(58) Field of Classification Search
  USPC .................................. 376/370, 373, 377
  See application file for complete search history.

(56) References Cited

U.S. PATENT DOCUMENTS

| | | | |
|---|---|---|---|
| 5,019,328 A | 5/1991 | Niino et al. | |
| 5,100,609 A | 3/1992 | Oosterkamp | |
| 5,106,573 A * | 4/1992 | Fennern | G21C 15/16 |
| | | | 376/370 |
| 5,180,546 A | 1/1993 | Van Kuijk | |
| 5,180,547 A | 1/1993 | Van Kuijk | |
| 5,268,945 A | 12/1993 | Van Kuijk | |
| 5,319,689 A * | 6/1994 | Challberg | G21C 15/16 |
| | | | 376/370 |
| 5,406,597 A * | 4/1995 | Fennern | G21C 9/02 |
| | | | 376/370 |
| 5,857,006 A * | 1/1999 | Oosterkamp | G21C 15/16 |
| | | | 376/377 |
| 7,835,483 B2 | 11/2010 | Chaki et al. | |
| 8,675,808 B2 | 3/2014 | Abe et al. | |
| 2007/0201607 A1* | 8/2007 | Watanabe | G21C 15/00 |
| | | | 376/371 |
| 2007/0274428 A1* | 11/2007 | Chaki | G21C 15/26 |
| | | | 376/308 |
| 2009/0116608 A1* | 5/2009 | Abe | G21C 15/26 |
| | | | 376/298 |
| 2016/0042820 A1* | 2/2016 | Sprague | G21C 15/26 |
| | | | 376/395 |
| 2016/0180973 A1* | 6/2016 | Deaver | G21C 15/26 |
| | | | 376/347 |
| 2016/0379724 A1* | 12/2016 | Carneal | G21C 13/02 |
| | | | 376/370 |

FOREIGN PATENT DOCUMENTS

| | | |
|---|---|---|
| JP | 2007232546 A | 9/2007 |
| WO | 2014076811 | 5/2014 |

* cited by examiner

CHIMNEYS HAVING JOINABLE UPPER AND LOWER SECTIONS WHERE THE LOWER SECTION HAS INTERNAL PARTITIONS

BACKGROUND

Figure 1:
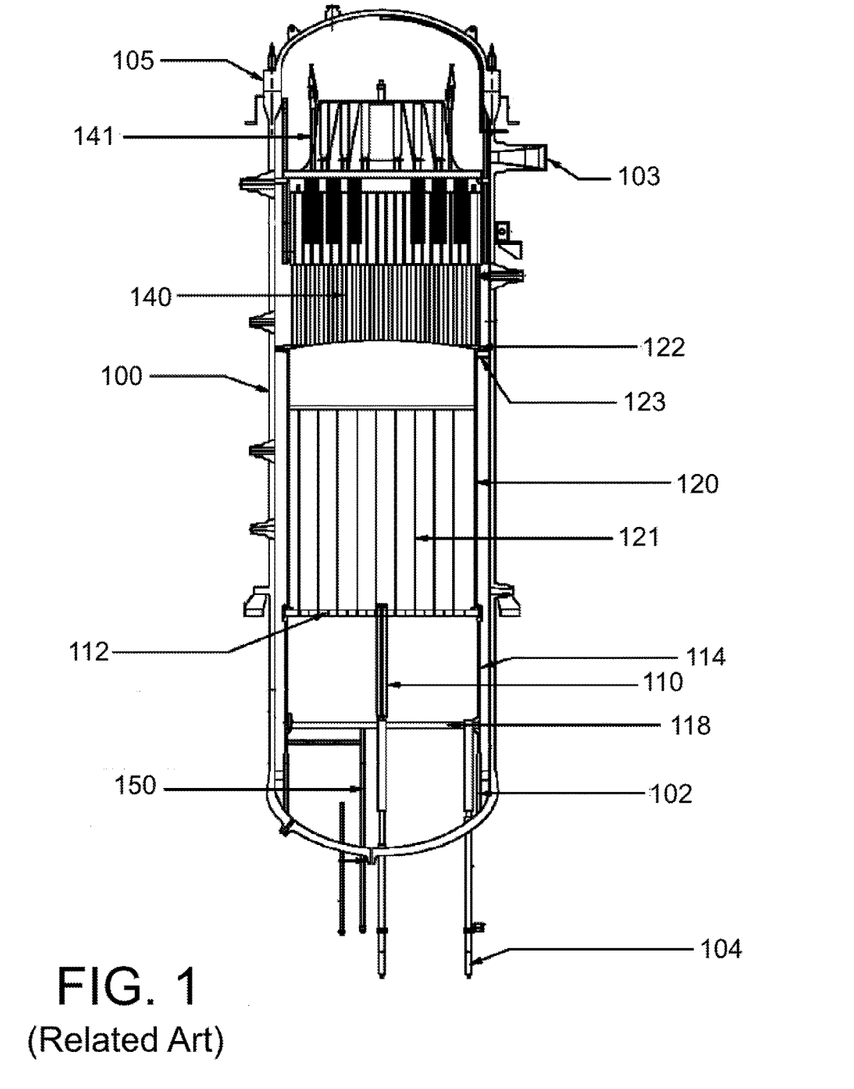
FIG. 1 is an illustration of a related art nuclear power vessel and internals.

FIG. 1 is cutaway view of a related art reactor pressure vessel 100, such as an ESBWR pressure vessel. Vessel 100 includes a core plate 118 laterally supporting one or more fuel assemblies 110 within core shroud 114. Core shroud 114 separates upward flow of coolant through the core and assemblies 110 therein from downcomer annulus flow. Core plate 118 further supports core shroud 114 and may itself be supported by support ring and legs 102. Top guide 112 is positioned at a top of the core shroud 114 and potentially bolted to core shroud 114. Top guide 112 may be a grid structure that provides lateral support and positioning to the top of fuel assemblies 110. Each opening in top guide 112 can provide lateral support and guidance for four fuel assemblies 110 (or in the case of peripheral openings at the edge of the core, two or three fuel assemblies). One or more instrumentation tubes 150 and control rod drives 104 may extend through a bottom of vessel 100 for control and monitoring of the conditions in the core.

As liquid coolant boils among assemblies 110, a heated mixture of steam and water flows upward through top guide 112. Chimney 120 receives the energetic steam/water mixture exiting fuel assemblies 110. Partitions 121 in chimney 120 limit cross flow and minimize potential for recirculating eddies in this heated coolant moving up through reactor 100. Chimney 120 may be relatively long, such as over 28 feet in vertical length, to accommodate larger reactor designs and/or encourage longer inertial lengths for heated steam/water exiting a core of reactor 100.

Chimney 120 may be bolted to top guide 112 at a lower end and support steam separators 140 at an opposite end. Chimney head 122 may be bolted to chimney 120 and laterally supported by chimney restraint 123, which may be paired, slip-fitting brackets on chimney 120 and an inner wall of vessel 100. In this way, chimney 120 remains static in vessel 100 as the steam/water mixture rapidly flows up through chimney 120. After exiting chimney 120, the steam/water mixture is directed into steam separators 140 that include a flat base (or a small dome) with an array of standpipes thereon and a separator structure at the top of each standpipe. The separator structure and standpipes in steam separators 140 separate liquid water from the steam-water mixture rising therethrough. Steam from the steam separators 140 flows upward to steam dryers 141, where additional moisture is removed. The separated and removed liquid is directed into a downcomer annulus between the outer wall of chimney 120 and inner wall of vessel 100. The dried steam exiting steam dryers 141 is then directed into main steam lines 103 for electrical power production.

During a reactor outage, such as a refueling outage or other maintenance period, top head 105 of vessel 100 may be removed, and internal structures of vessel 100, such as steam dryers 141 and steam separators 140 may be removed to access the fuel assemblies 110. During such an outage, loading equipment may move and load new fuel assemblies 110 into reactor 100 while removing or shuffling older or spent fuel assemblies 110. Such moves may be made with top guide 112 and/or chimney 120 in place, if sufficient clearances are maintained in these structures.

Figure 2:
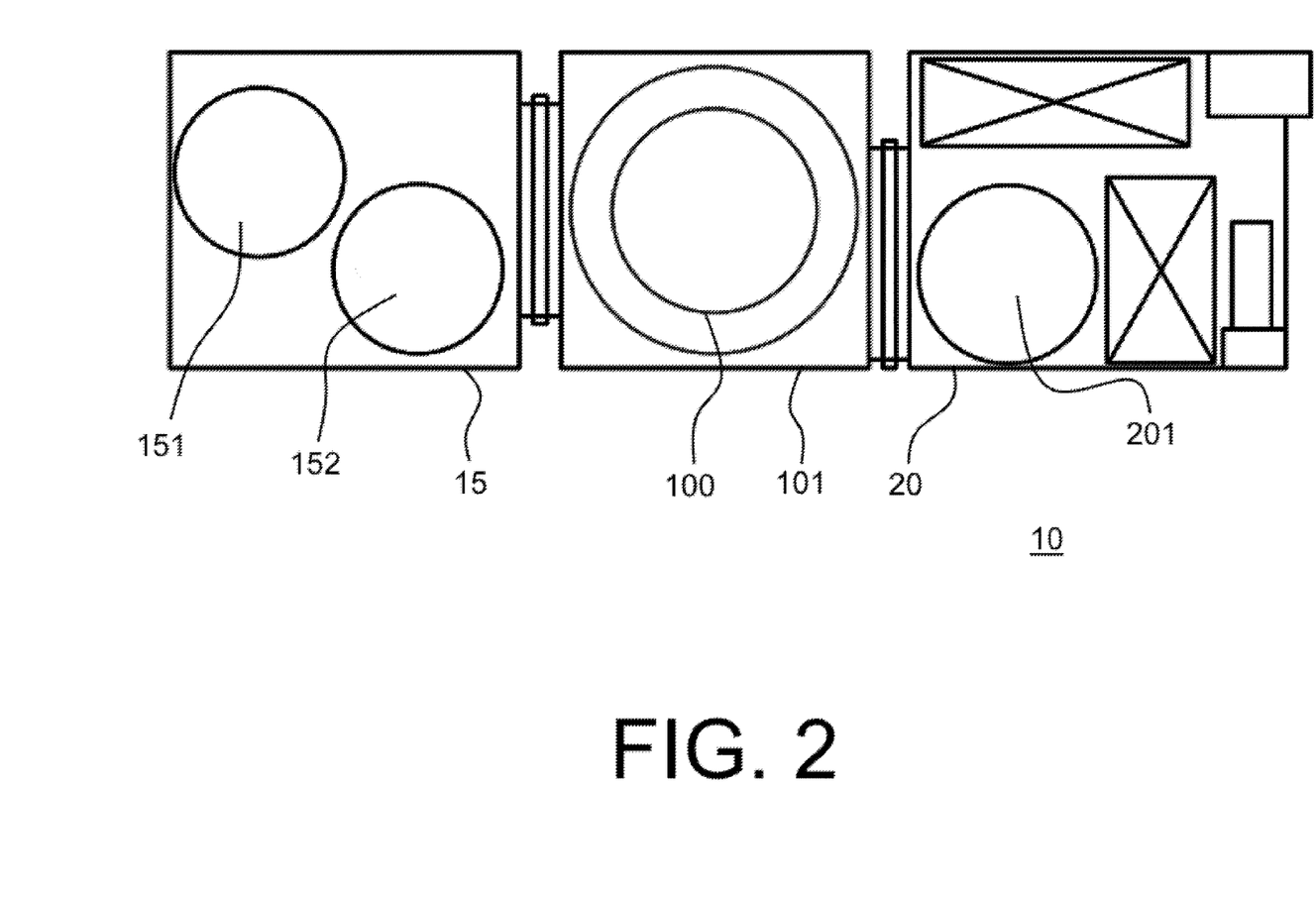
FIG. 2 is a schematic of a refueling floor layout usable with example methods.

FIG. 2 is a schematic of an example refueling floor 10 layout during a refueling outage, with reactor 100 shutdown and opened for refueling. As shown in FIG. 2, an equipment pool 15 and a buffer pool 20 may be available on refueling floor 10 for movement and storage of reactor components. An area 101 about reactor 100 may be filled with water, or flooded, above an open top of reactor 100, permitting liquid communication and submerged movement between pools 101, 15, and 20 on refueling floor 10, allowing submerged movement of components from reactor 100 and into/between pools 15 and 20. Pools 15 and 20 are typically about 22 feet deep when maximally flooded, as set by floor elevations on refueling floor 10. As seen in FIG. 2, steam dryer 141 may be removed from reactor 100 and placed in equipment pool 15 during an outage.

SUMMARY

Example embodiments include modular chimneys usable in nuclear plants and reactors with storage areas for use during an outage of the nuclear reactor. Example embodiment chimneys include sections that may be freely connected and disconnected without destruction for use in and removal from the nuclear reactor. For example, chimney sections may be joined via seismic pins, bolts, and/or other fasteners at flanges of the sections that are readily disassembled during an outage. Modular chimneys may include sections with partitions that divide and direct steam flow from a nuclear core, empty sections with no partitions or internal fill, and/or steam separator or dryer structures. Each chimney section is dimensioned to individually fit within the storage areas of the nuclear plant, such as equipment or buffer pools on the refueling floor of the plant. During operation, example modular chimneys are usable in place of existing single-piece chimneys to similarly direct fluid flow uniformly throughout the reactor during operation and are further readily removable from the reactor during outages.

Example methods include nondestructively moving the steam dryer, steam separator, and chimney sections out of the reactor and into storage areas. An upper section of the chimney may be moved on or under the steam dryer. Each move may be performed underwater or substantially underwater to reduce radiation exposure and limit containment hazards.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Because this is a patent document, general broad rules of construction should be applied when reading and understanding it. Everything described and shown in this document is an example of subject matter falling within the scope of the appended claims. Any specific structural and functional details disclosed herein are merely for purposes of describing how to make and use example embodiments or methods. Several different embodiments not specifically disclosed herein fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that the terms "comprises", "comprising,", "includes" and/or "including", when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

The inventors have recognized that a longer chimney, such as one extending over 28 feet, is desirable to provide well-directed coolant flow out of a reactor core during operation; however, the inventors have further recognized that a chimney unduly interferes with fuel movement and reloading. Particularly, in larger cores like ESBWRs, chimneys above the core make accessing peripheral assemblies difficult or impossible. Partitions in the chimney can further interfere with accessing core components and manipulation of fuel assemblies therein. As such, the Inventors have newly recognized that a chimney above a reactor core should be removed during refueling, along with steam separating and drying structures, in order to simplify and expedite core reloading, which is typically a costly, higher-radiation-dose-incurring, and higher-resource-consuming period for a nuclear reactor power plant.

The Inventors have further recognized a problem with the new concept of removing a chimney from a reactor during refueling—buffer and equipment pools available in nuclear power plants are insufficiently deep to completely submerge a longer chimney during refueling operations. Particularly, most pools do not exceed a length of the chimney, such as 22 feet, and there is insufficient space to orient a chimney any way other than vertically in the limited pools available on the refueling floor. Allowing any portion of a reactor component to remain unsubmerged, such as if a 28-foot chimney 120 (FIG. 1) were placed in the existing 22-foot-deep equipment pool 15 (FIG. 2), greatly increases dosage to workers in the surrounding area as well as increases risk of surface contamination or other material interaction with the exposed component. Further, removing a related art chimney may require complicated and powerful lifting cranes or strongbacks and present a danger or risk of loss in handling such an extremely large component. Example embodiments described below address these and other problems recognized by the Inventors with unique solutions enabled by example embodiments.

The present invention is a removable chimney system for use in a nuclear reactor. In contrast to the present invention, the small number of example embodiments and example methods discussed below illustrate just a subset of the variety of different configurations that can be used as and/or in connection with the present invention.

Figure 3:
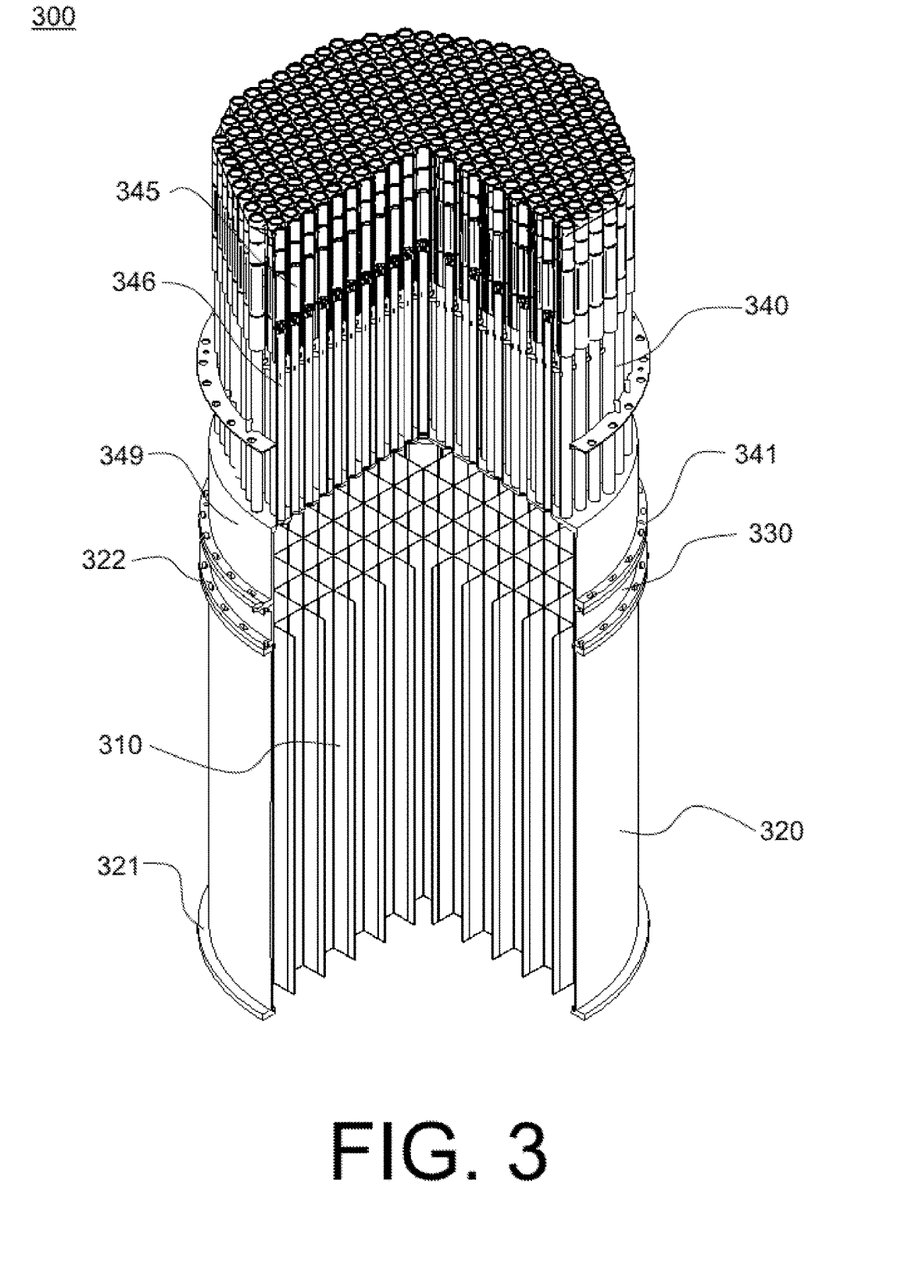
FIG. 3 is a sectional illustration of an example embodiment removable chimney system.

FIG. 3 is an illustration of an example embodiment chimney system 300. As shown in FIG. 3, system 300 may include several similar characteristics and shaping as related art chimney 120 (FIG. 1) and be compatible with, and usable in place of, chimney 120 in several known reactor designs. Particularly, example embodiment system 300 may be employed directly above a core at a top guide in existing reactor designs and function as a chimney directing superheated coolant flow therein.

FIG. 3 is a cut-away illustration showing internals of an example embodiment chimney system 300. As shown in FIG. 3, example embodiment system 300 includes one or more nondestructively removable portions. For example, system 300 may include a lower chimney portion 320, an upper chimney portion 330, and a steam separator portion 340 joinable to each other to form a single chimney structure in system 300.

Lower chimney portion 320 may include several partitions 310 running all or part of its length. For example, if lower chimney 320 is 21.6 feet tall, partitions 310 may also be 21.6 feet or less in length. Partitions 310 may span all or part of lower portion 320 in a radial direction; for example, if lower potion 320 is cylindrical and of a size to match a nuclear core immediately thereunder, partitions 310 may be present above the core space. Partitions 310 may be at any desired density; for example, each partition may form a continuous channel that receives steam and water flow from four fuel assemblies from below, accounting for the entire core outflow into channels created by partitions 310. Of course, partitions 310 may be denser or sparser and may include apertures or be solid, based on desired coolant flow control. Partitions 310 may be rigidly joined and/or integral with lower chimney 320, such as by bolting, welding, molding, casting, etc. In this way, partitions 310 may readily move with lower chimney portion 320 and not risk any damage from relative movement of partitions 310 and portion 320. An integral formation may also improve coolant flow, preventing backflow or eddy formation in any clearance that might exist if partitions 310 were separate from lower chimney portion 320.

Lower chimney portion 320 may include a lower flange 321 that matches and aids in joining a top guide, such as top guide 112 (FIG. 1). For example, lower flange 321 may match an outer perimeter of a circular top guide and be joinable to the top guide via bolting, removable joints, screwing, or any other removable joining structure. In this way, lower portion 320 may be secured to a top guide in a nuclear reactor so as to remain stationary with the core and unmoved by energetic fluid flow.

Example embodiment chimney system 300 also includes an upper chimney portion 330 that can removably join to lower chimney portion 320. As seen in FIG. 3, upper chimney portion 330 generally matches and extends lower portion 320. For example, upper chimney portion 330 may be cylindrical with a same perimeter as lower portion 320 and extend vertically approximately 2.5 feet. Upper chimney portion 330 may be completely voided inside or may include partitions, either matching or different from partitions 310.

As shown in FIG. 3, example embodiment chimney system 300 may further include a steam separator 340. Steam separator 340 may include several features of related separators, like features of separator 140 (FIG. 1). For example, steam separator 340 may include several standpipes 346 matched with alternatively-sized upper tubes 345 to gather and remove liquid from a steam/water mixture flowing through steam separator 340. Steam separator 340 may also include a lower extension 349 that connects to other components of example system 300. For example, lower extension 349 may match and vertically extend upper chimney portion 330 by being a same cylindrical shape. Lower extension may be approximately 4.1 feet or any other desired vertical length. Given typical lengths of steam separators, an additional 4.1 feet added by lower extension 349 may bring steam separator 340 to an overall vertical length of 21.6 feet, potentially similar to a length of lower chimney portion 320.

Figure 4:
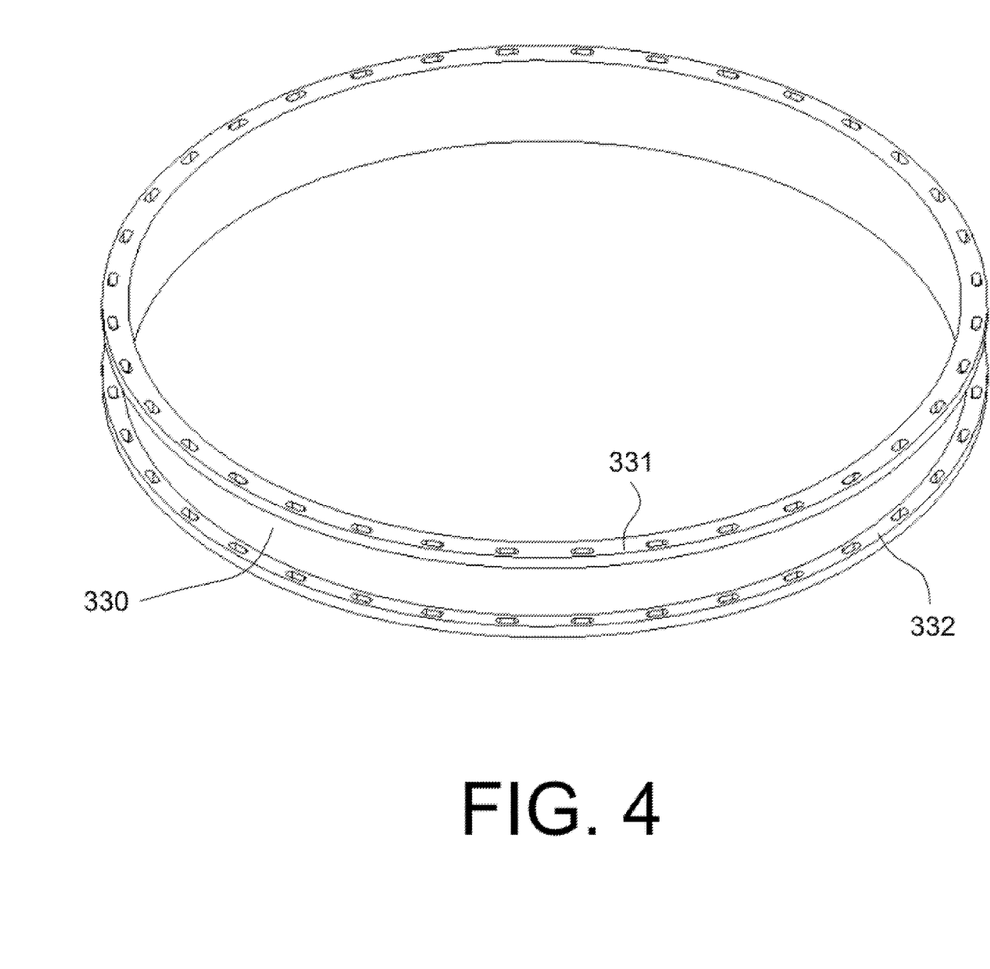
FIG. 4 is an illustration of an upper chimney portion usable with example embodiment chimney systems.

Lower chimney portion 320, upper chimney portion 330, and/or steam separator portion 340 may include flanges that aid in removably joining these components. FIG. 4 is a detail illustration of upper chimney portion 330 usable in example embodiment system 300. As shown in FIG. 4, upper chimney portion 330 may include an upper flange 331 and a lower flange 332 that facilitate mating or joining between adjacent pieces. Flanges 331 and 332 may include one or more bolt holes or other attachments by which a structure may secure upper chimney portion 330 to adjacent pieces. Similarly, as seen in FIG. 3, lower chimney portion 320 may include an upper flange 322 that matches lower flange 332 (FIG. 4) of upper chimney portion 330. Steam separator portion 340 may include a lower flange 341 that matches upper flange 331 (FIG. 4) of upper chimney portion 330. Each of these flanges may accommodate several different joining structures, including bolts, locks, releasable ratchets, screws, clamps, etc. that facilitate removable joining of portions 320, 330, and 340 into a single rigid chimney system 300.

Figure 5:
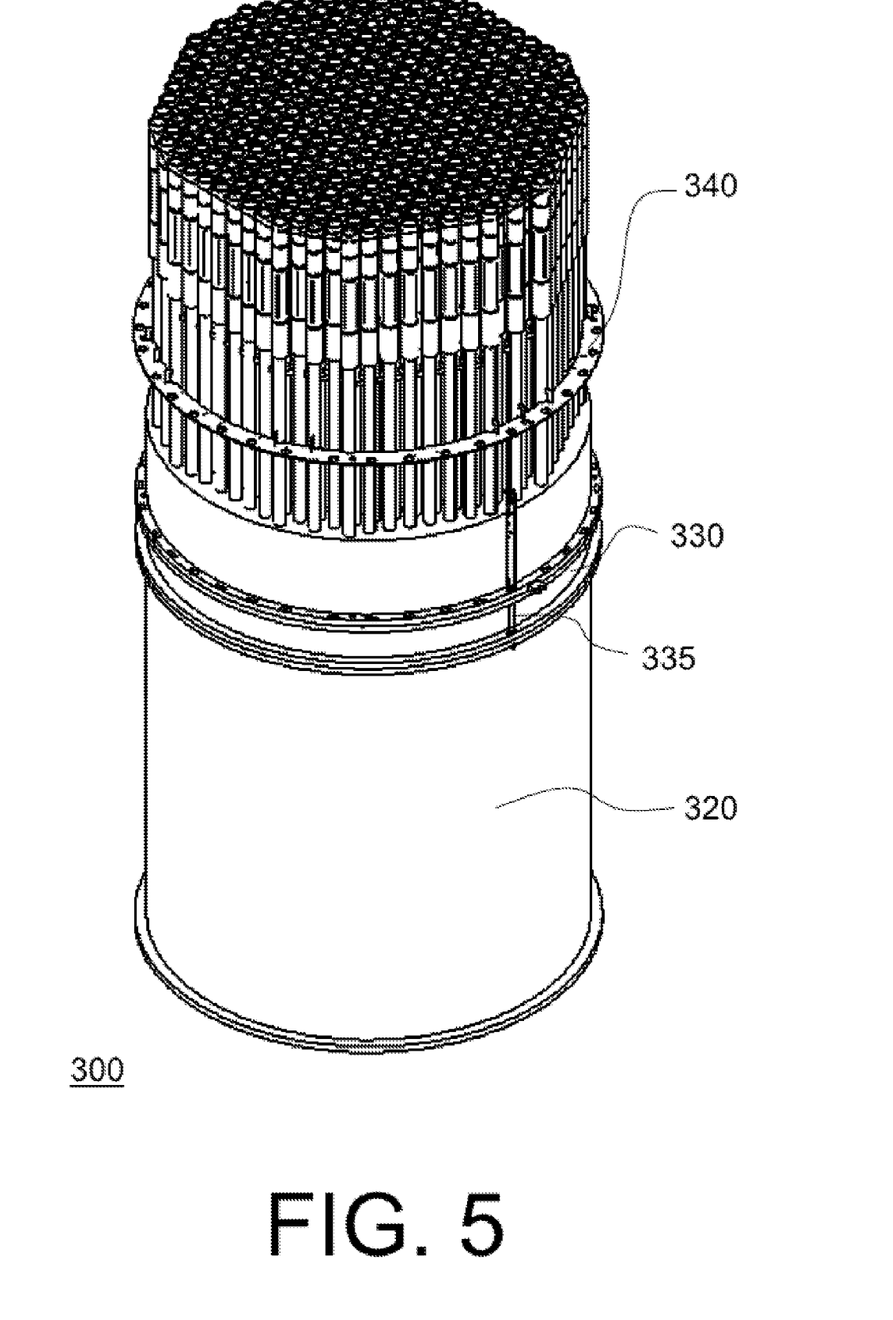
FIG. 5 is an illustration of an assembled example embodiment removable chimney system.

FIG. 5 is an illustration of example embodiment chimney system 300 as fully assembled, as system 300 may appear on a top guide and below a steam dryer within a nuclear reactor 100 (FIG. 1), in place of a related chimney 120 and steam separator 140 (FIG. 1). As seen in FIG. 5, lower chimney portion 320, upper chimney portion 330, and steam dryer 340 may directly touch and be joined. For example, a bolt 335, such as a thermal bolt, with a T-shaped end and nut securing the bolt at an opposite end, may run over 2.5 feet from flanges of the steam separator 340 and lower chimney portion 320 to bolt all of components 340, 330, and 320 together. Several bolts 335 may be used at various perimeter positions. Seismic pins (not shown) may provide lateral support at these flanges and other positions, preventing lateral misalignment between the portions. Of course, other clamps, latches, screws, etc. may removably join chimney system 300 as a single body having desired rigidity under operating nuclear power conditions.

Components in example embodiment system 300 are fabricated of resilient materials that are compatible with an operative nuclear reactor environment without substantially changing in physical properties. For example, several known structural materials, including austenitic stainless steels 304 or 316, XM-19, zirconium alloys, nickel alloys, Alloy 600, etc. may be chosen for any element of components of example embodiment system 300. Joining structures and directly-touching elements may be chosen of different and compatible materials to prevent fouling.

As assembled in the example of FIG. 5, system 300 may span about 28.2 feet including lower chimney portion 320, upper chimney portion 330, and a lower extension 349 (FIG. 3) of steam separator 240. Steam separator 340 above lower extension 341 may span an additional 17.5 feet. This 28.2 feet may be a similar dimension to related single-piece chimneys and/or steam separators in nuclear reactors. Similarly, steam separator 340 may have a total length of about 21.6 feet, approximately the same as existing separator heights plus a height of a lower extension used in example embodiment 300. In this way, each component 320, 330, and 340 is under 22 feet in total vertical height and may be less than the deepest 22-feet pools in existing refueling floor designs. Thus, if pursuing a new chimney-removal strategy during reloading, example embodiments may be sized to be fully submersible in existing pools without need for pool or working surface elevation redesigns, which may be intensely complex in a commercial nuclear reactor setting. Of course, these dimensions of vertical height may be adjusted based on reactor design, such that example embodiment system 300 may function for any chimney with alternate dimensions.

Example Methods

Figure 6:
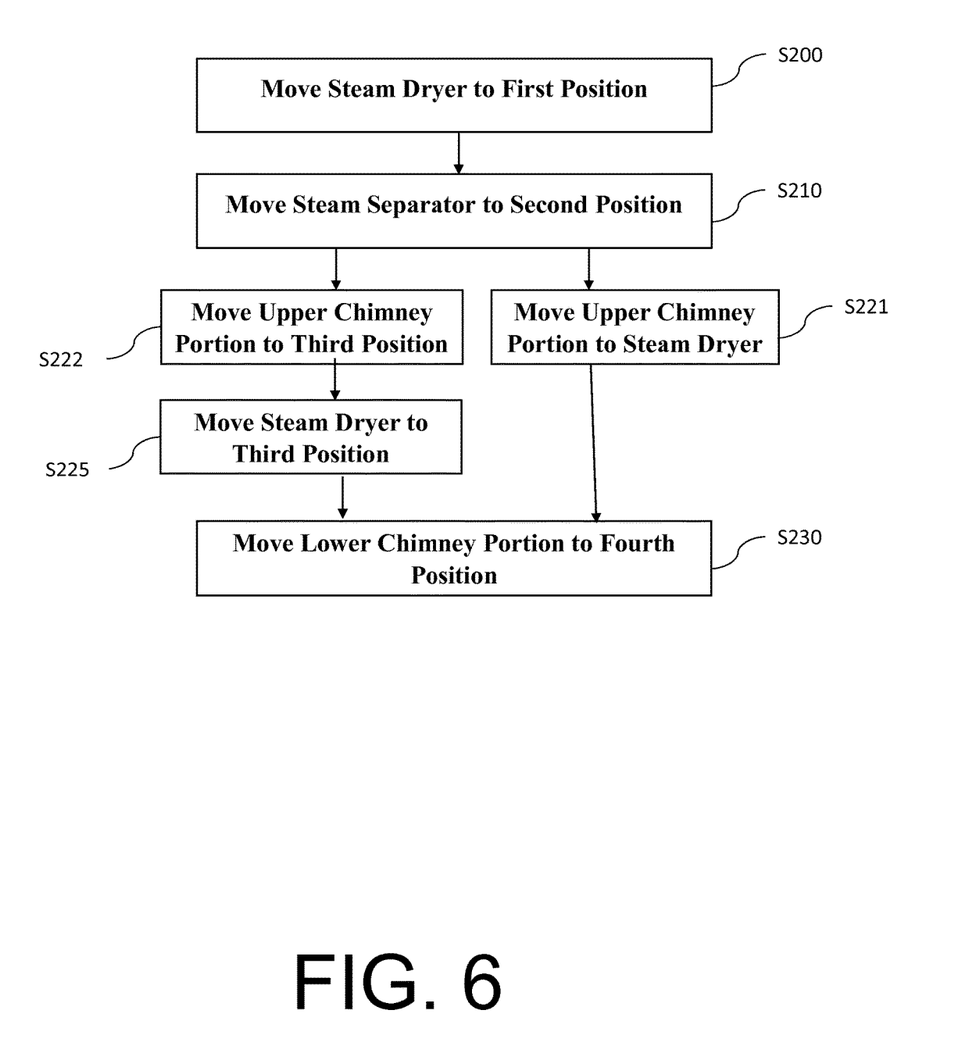
FIG. 6 is a flow chart of an example method of unloading a chimney system.

Example embodiment chimney systems can be used in example methods of preparing a nuclear reactor for refueling that includes removing the chimney from the reactor. FIG. 6 is a flow chart illustrating an example method, which may be executed during a plant outage with access to reactor internals and pools in a refueling floor layout. As seen in FIG. 6, a steam dryer is moved to a first location in S200. For example, the location could be a free space 151, 152, or 201 in an equipment pool 15 or buffer pool 20 (FIG. 2). Of course, preparation and other equipment removal may occur before S200 during a reactor outage. The movement in S200 may be made completely underwater between reactor and pool or with a limited flyover so as to minimize exposure of personnel and the steam dryer.

In S210, the steam separator, typically vertically below the steam dryer in the reactor, is moved to a second position. For example, in FIG. 2, if the steam dryer is moved to a free space 151 or 152 in equipment pool 15, the steam separator may be moved to a free space 201 in buffer pool 20, or any other free space apart from the steam dryer. The moving in S210 may be performed underwater or with flyover, and, if using steam separator 340 from example system 300 (FIG. 3), the moving may place steam separator 340 completely under water in the second position of a pool with 22-foot depth or more. Of course, additional reactor preparation activities may take place before S210, including plugging main steam lines and ICS systems in the reactor for proper liquid retention or isolation at elevations above the chimney components.

After the steam separator is moved in S210, the upper chimney portion may be accessed and moved in S222 and/or S221. In S221, the upper chimney portion can be seated atop the steam dryer that was moved to the first position in S200. For example, an upper chimney portion 330 (FIG. 3) can be placed atop steam dryer 141 (FIG. 1) in free space 151 in equipment pool 15 (FIG. 2) in S221. As a part of moving the upper chimney portion in S221, the steam dryer may be outfitted with lifting lugs that better accommodate the upper chimney portion resting atop the steam dryer in the first position, without damaging the steam dryer. Because the steam dryer and upper chimney portion may have a total height less a pool in which the first position is located—such as steam dryer 141 and upper chimney portion 330 having a total vertical height of less than 22 feet when stacked and an equipment pool 15 having a depth over 22 feet—S221 may be accomplished without any exposure of the steam dryer or chimney portion. As stored, the steam dryer and upper chimney portion may be covered by at least 6 inches of water, potentially more if stored in a pool that can be flooded higher.

Alternatively, in S222, the upper chimney portion may be moved to a third position separate from the first position where the steam dryer is placed. Then, in S225, the steam dryer may be moved from the first position to the third position over the upper chimney portion to cover the upper chimney portion, which fits inside the steam dryer. For example, using upper chimney portion 330 of example embodiment system 300 (FIG. 3), a steam dryer 141 (FIG. 1) may be moved to open space 152 in equipment pool 15 in S200; then in S222, upper chimney portion 330 may be moved to open space 151 in equipment pool 15; and finally in S225, steam dryer 141 may be relocated over the chimney portion 330 in open space 151, all in equipment pool 15. The upper chimney portion may be sized to fit within the steam dryer, such that the two are not stacked and take up only the about 17 vertical feet, potentially well below the surface of any pool where the third position is located.

While S222 and S225 provide an advantage of not requiring stacking and the attendant reworking of loading lugs of the steam dryer to support the stacked upper chimney section as S221, the size of any pool may require the upper chimney section to be flown over the steam dryer in S222, temporarily exposing the upper chimney section and increasing radiation dose and/or contamination. Operators may choose between or combine the moves of S222/S225 and S221 based on pool sizes, shielding needs, and/or an ability of the upper chimney portion and the steam dryer to either be stacked or nested.

Regardless of the movement of the steam dryer, steam separator, and upper chimney portions in S200-S225, once the lower chimney portion is available, it may be moved to a fourth position in S230. For example, lower chimney portion 320 (FIG. 3) may be moved to open space 152 in equipment pool 15 (FIG. 2) apart from the stacked/nested steam dryer and upper chimney portion in open space 151. The moving in S230 may also be achieved completely underwater, and because the lower chimney portion is likely more radioactive from its former proximity to the core in the reactor, the moving in S230 may advantageously use a fourth position that is apart from other components and at great shielding depths, such as equipment pool 15.

The movements of S200-S230 may be accomplished with a crane system with strongback or other reactor component handling equipment for the reactor. Because multiple, shorter chimney portions from example embodiment system 300 are usable with example methods, the movements of S200-S230 may be relatively simplified and not require movement of a single chimney with potentially moving parts and/or extreme mass.

Further, any of S200, S210, S222, S225, and S230 may include the removal of any joining mechanisms and other securing features, such as thermal bolts, seismic pins, etc. in order to freely move the upper chimney portion and/or steam dryer between desired locations. For example, any of these actions may further include removal of any joining structure, such as bolt(s) 335 (FIG. 5), seismic pins, screws, clamps, latches, locks, etc. in order to free the steam separator and/or any chimney portions for independent movement in example methods.

Additionally, any of S200, S210, S222, S225, and S230 may include adding inches of water to a depth to any pool containing the first, second, third, or fourth positions where components are stored, such as through edge buffers, or addition of any other shielding materials. Such additional depth may provide additional shielding to components stacked in the pools and/or prevent the need for flyover. However, it is understood that adding more than a few inches of depth is unnecessary and would require reworking of entire reactor building elevations and/or pool heights on a refueling floor, an already space-sensitive area.

Once the example method of FIG. 6 is complete, fuel within a core of the reactor may be completely accessible to fuel handling equipment with no chimney or other structures blocking a top guide. Fuel movements may then commence, and, when complete, the method of FIG. 6 may be reversed as it was executed in order to reassemble the chimney and steam dryer in the reactor prior to startup.

Example embodiments and methods thus being described, it will be appreciated by one skilled in the art that example embodiments may be varied and substituted through routine experimentation while still falling within the scope of the following claims. For example, a variety of different plant types and core and reactor sizes and configurations are compatible with example embodiments and methods simply through proper dimensioning of example embodiments—and fall within the scope of the claims. Such variations are not to be regarded as departure from the scope of these claims.

What is claimed is:

1. A chimney system that is removable from a commercial nuclear reactor, the system comprising:
    a lower chimney section shaped to surround fluid flow from a core of the nuclear reactor, wherein the lower chimney section includes a plurality of internal partitions that are one-piece with the lower chimney section; and
    an upper chimney section removably joinable to the lower chimney section.

2. The system of claim 1, further comprising:
    a steam separator removably joinable to the lower chimney section.

3. The system of claim 2, wherein the steam separator includes a lower extension that matches and is removably joinable to the upper chimney section.

4. The system of claim 3, wherein the steam separator directly touches the upper chimney section at the lower extension, and wherein the upper chimney section directly touches the lower chimney section.

5. The system of claim 4, wherein the lower extension is approximately 4.1 feet in vertical length, the upper chimney section is approximately 2.5 feet in vertical length, and the lower chimney section is approximately 21.6 feet in vertical length.

6. The system of claim 4, wherein the lower extension, the upper chimney section, and the lower chimney section each include flanges that are removably joinable to each other where the flanges directly touch.

7. The system of claim 1, wherein the upper chimney section and the lower chimney section are cylindrical, and wherein the upper chimney section is completely voided.

8. The system of claim 1, wherein the internal partitions form several closed channels within the lower chimney section, and wherein each of the closed channels is configured to receive fluid flow from fuel assemblies below the lower chimney section in the core.

9. The system of claim 1, further comprising:
a thermal bolt removably joining the upper chimney section and the lower chimney section.

10. A nuclear plant comprising:
a nuclear reactor;
a storage pool for use during an outage of the nuclear reactor; and
a chimney system including,
  a lower chimney section shaped to surround fluid flow from a core of the nuclear reactor, wherein the lower chimney section includes a plurality of internal partitions that are a single piece with the lower chimney section,
  an upper chimney section removably joinable to the lower chimney section, wherein each of the lower chimney section and the upper chimney section are sized to fit completely in the storage pool so that no portion of the chimney system extends out of the storage pool,
  a thermal bolt removably joining the upper chimney section and the lower chimney section, and
  a steam separator that is further joined to the upper chimney section and the lower chimney section by the thermal bolt.

11. The system of claim 10, wherein the steam separator includes a lower extension that matches and is removably joinable to the upper chimney section.

12. The nuclear plant of claim 10, wherein the storage pool is a plurality of the storage pools, the plant further comprising:
a refueling floor from which the nuclear reactor and the storage pool are accessible.

13. The nuclear plant of claim 12, further comprising:
a steam dryer for use in the nuclear reactor during operation, wherein the upper chimney section and the lower chimney section are sized to fit completely in the storage pools with the steam dryer so that no portion of the steam dryer extends out of the storage pool.

14. The nuclear plant of claim 10, wherein the pool is at least 22 feet in vertical depth,
and wherein the upper chimney section is approximately 2.5 feet in vertical length, and the lower chimney section is approximately 21.6 feet in vertical length.

15. A modular chimney system that is removable from a commercial nuclear reactor, the system comprising:
a lower chimney section shaped to surround fluid flow from a core of the nuclear reactor, wherein the lower chimney section includes a plurality of internal partitions that are one-piece with the lower chimney section;
an upper chimney section removably joinable to the lower chimney section;
a thermal bolt configured to removably join the upper chimney section and the lower chimney section; and
a steam separator configured to join to the upper chimney section and the lower chimney section by the thermal bolt.

16. The system of claim 15, wherein the steam separator includes a lower extension that matches and is removably joinable to the upper chimney section.

17. The system of claim 16, wherein the steam separator directly touches the upper chimney section at the lower extension, and wherein the upper chimney section directly touches the lower chimney section.

18. The system of claim 17, wherein the lower extension is approximately 4.1 feet in vertical length, the upper chimney section is approximately 2.5 feet in vertical length, and the lower chimney section is approximately 21.6 feet in vertical length.

19. The system of claim 17, wherein the lower extension, the upper chimney section, and the lower chimney section each include flanges that are removably joinable to each other where the flanges directly touch.

20. The system of claim 11, wherein the lower extension is approximately 4.1 feet in vertical length, the upper chimney section is approximately 2.5 feet in vertical length, and the lower chimney section is approximately 21.6 feet in vertical length.

* * * * *